US011455605B2

(12) United States Patent
Quentin et al.

(10) Patent No.: US 11,455,605 B2
(45) Date of Patent: Sep. 27, 2022

(54) METHOD FOR PROCESSING TRANSACTIONAL DATA, CORRESPONDING DEVICE AND PROGRAM

(71) Applicant: Banks and Acquirers International Holding, Paris (FR)

(72) Inventors: Pierre Quentin, Enghien-les-Bains (FR); Michel Leger, Saint-Germain-en-Laye (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 305 days.

(21) Appl. No.: 15/201,561

(22) Filed: Jul. 4, 2016

(65) Prior Publication Data
US 2017/0004462 A1 Jan. 5, 2017

(30) Foreign Application Priority Data

Jul. 3, 2015 (FR) ...................................... 1556333

(51) Int. Cl.
| | |
|---|---|
| *G06Q 20/10* | (2012.01) |
| *G06Q 20/20* | (2012.01) |
| *G06Q 20/02* | (2012.01) |
| *G06Q 20/32* | (2012.01) |
| *G06Q 20/34* | (2012.01) |
| *G06Q 20/40* | (2012.01) |

(Continued)

(52) U.S. Cl.
CPC ............. *G06Q 20/10* (2013.01); *G06Q 20/02* (2013.01); *G06Q 20/20* (2013.01); *G06Q 20/327* (2013.01); *G06Q 20/3227* (2013.01); *G06Q 20/34* (2013.01); *G06Q 20/405* (2013.01); *H04L 67/02* (2013.01); *H04L 67/10* (2013.01)

(58) Field of Classification Search
CPC ........ G06Q 20/10; G06Q 20/02; G06Q 20/20; G06Q 20/3227; G06Q 20/327; G06Q 20/34; G06Q 20/405; G06Q 40/00; H04L 67/02; H04L 67/10
USPC ...................................................... 705/35–45
See application file for complete search history.

(56) References Cited

U.S. PATENT DOCUMENTS

| | | | |
|---|---|---|---|
| 6,847,816 B1 * | 1/2005 | Sarradin ............... | G07F 7/1008 455/407 |
| 2007/0011416 A1 * | 1/2007 | Lee ....................... | G06F 3/0617 711/162 |

(Continued)

FOREIGN PATENT DOCUMENTS

WO 2014162294 A1 10/2014

*Primary Examiner* — Christopher Bridges
*Assistant Examiner* — Timothy T. Hsieh
(74) *Attorney, Agent, or Firm* — David D. Brush; Westman, Champlin & Koehler, P.A.

(57) ABSTRACT

The invention relates to a method for processing transactional data representing a payment between a user (U) and a merchant (M), the method being implemented by an electronic device for processing transactions situated within a communications network. Such a method comprises:
  a step (100) for receiving a request for processing a transaction (ReqTT) coming from a merchant server (SerMar);
  a step (110) for obtaining a piece of data representing a payment parameter (ParPai) associated with said merchant server (SerMar);
  a step (140) for transmitting a request for processing payment (ReqTrtPai) to a payment server (SerPai).

7 Claims, 2 Drawing Sheets

(51) Int. Cl.
*H04L 67/02* (2022.01)
*H04L 67/10* (2022.01)

(56) References Cited

U.S. PATENT DOCUMENTS

| | | | | |
|---|---|---|---|---|
| 2007/0078761 | A1* | 4/2007 | Kagan | G06Q 20/322 |
| | | | | 705/39 |
| 2008/0189186 | A1* | 8/2008 | Choi | G06Q 20/32 |
| | | | | 705/26.35 |
| 2010/0153194 | A1* | 6/2010 | Oram | G06Q 40/12 |
| | | | | 705/14.1 |
| 2010/0186078 | A1* | 7/2010 | Napoli | H04L 9/3231 |
| | | | | 726/9 |
| 2011/0022482 | A1* | 1/2011 | Florek | H04M 17/00 |
| | | | | 705/16 |
| 2011/0196796 | A1* | 8/2011 | Florek | G06Q 20/382 |
| | | | | 705/64 |
| 2012/0072347 | A1* | 3/2012 | Conway | G06Q 20/04 |
| | | | | 705/44 |
| 2013/0198067 | A1* | 8/2013 | Fasoli | G06Q 20/3567 |
| | | | | 705/41 |
| 2013/0246259 | A1 | 9/2013 | Dessert | |
| 2013/0304651 | A1 | 11/2013 | Smith | |
| 2014/0249999 | A1* | 9/2014 | Johnson | G06Q 20/0855 |
| | | | | 705/39 |
| 2014/0337230 | A1 | 11/2014 | Bacastow | |
| 2015/0032600 | A1* | 1/2015 | Castinado | G06Q 20/10 |
| | | | | 705/39 |
| 2015/0120574 | A1* | 4/2015 | Xia | G06Q 20/40145 |
| | | | | 705/75 |
| 2015/0154597 | A1 | 6/2015 | Bacastow | |
| 2015/0248664 | A1* | 9/2015 | Makhdumi | G06Q 20/20 |
| | | | | 235/380 |
| 2015/0339234 | A1* | 11/2015 | Karandikar | G06F 12/0888 |
| | | | | 711/137 |
| 2015/0339644 | A1* | 11/2015 | Stults | G06Q 20/12 |
| | | | | 705/23 |
| 2016/0042336 | A1* | 2/2016 | Tajima | G06Q 20/202 |
| | | | | 705/21 |
| 2016/0048828 | A1* | 2/2016 | Lee | G06Q 20/354 |
| | | | | 705/39 |
| 2016/0239837 | A1* | 8/2016 | Klingen | G06Q 20/3227 |

* cited by examiner

METHOD FOR PROCESSING TRANSACTIONAL DATA, CORRESPONDING DEVICE AND PROGRAM

BACKGROUND OF THE INVENTION

Field of the Invention

The present technique relates to the issues and problems of online payment. The present technique relates more specifically to the implementation of a payment in the context of an electronic commerce transaction also called an "e-commerce" or "e-business" transaction. The present technique is aimed more particularly at facilitating payment.

Description of the Related Art

An e-commerce transaction is characterized by the fact that it is implemented through an Internet browser accessing a server application (typically an electronic commerce application generating data intended for the web browser). The e-commerce transaction, in the context of the present application, is considered to be identical to the m-commerce application. In general, an e-commerce transaction is differentiated from an m-commerce transaction by the fact that the m-commerce transaction implements a particular application installed on a mobile (smartphone-type) communications terminal and is used to make both purchases and payment transactions.

Be that as it may, an e-commerce transaction currently comprises an entry, by the user, of data enabling a payment to be made. This data is often bankcard data. The data is for example the name of the card-holder, the card number (also called a PAN), the date of expiry of the card and a visual cryptogram. In most cases, these pieces of data are entered by the user when finalizing a purchase. For example, after the purchaser's basket has been validated on the vendor's platform, the user is transferred (from one page to another in the web browser) to a payment server. It is on the page displayed by this payment server that the user enters the bankcard data. If necessary, in addition to this data, the payment server jointly with a bank server can request the entry of a complementary piece of data. This data can be for example a code generated by the bank server on the basis of the bankcard number entered by the user. This code is for example transmitted to the user by means of an SMS type message on a device (typically the user's telephone) separate from the device used by the user to carry out the payment. When this code is entered, the transaction is finalized between the payment server, the bank server and the merchant's server.

This general system for payment poses problems for two reasons. The first reason is related to the need, for the user, to enter his bankcard data for each payment. It will be understood that, for reasons of security, it is preferable for this data to be entered each time that payment is made. However, this is a source of constraint and requires the user to bring out his bankcard to enter this information. To mitigate this problem, there are software solutions such as a password manager (for example DashLane™). These software solutions, installed on the user's communications device (the computer or the tablet), enables the automatic entry, in fields provided for this purpose, of data previously entered in the software. However, firstly this requires the entry of data in a third-party software program which must first of all be installed on the user's communications device; secondly, this approach calls for trust in the publisher of this software as regards the preservation of this data. Online solutions also exist: they make it possible not to have to install software on the user's communications device but nevertheless call for trust in an editor (for example Google™) for the conservation of this data. Now this trust has greatly deteriorated in recent years. Besides, this solution of preserving bankcard data within the communications device can raise problems in the event of theft or loss of the communications device.

The second problem is related to the need to enter a communications code transmitted for example by SMS. This solution is implemented precisely to prevent misuse related to thefts and loss of bankcards and/or to prevent abuse related to thefts and losses of the communications card. Now, it has been shown that this solution greatly reduces the conversion rate (the ratio between the number of purchases made and the number of visits to a site). This solution therefore does not receive widespread support from merchant sites.

SUMMARY OF THE INVENTION

The present technique does not have these drawbacks of the prior art. More particularly, the present technique relates to a method for processing transactional data representing a payment between a user and a merchant, a method implemented by an electronic device for processing transactions situated within a communications network. Such a method comprises:
  a step for receiving a request for processing a transaction coming from a merchant server;
  a step for obtaining a piece of data representing a payment parameter associated with said merchant server;
  a step for transmitting a request for processing payment to a payment server.

Thus, the electronic device for processing transactions (or transaction-processing electronic device), also called a transactions server or again a transactional server, is capable of carrying out an optimized management of transactions. Indeed, owing to its quality as a receiver of transaction-processing requests coming from merchant servers (it is clear that several merchant servers are capable of making use of the transaction-processing device), the transaction-processing device can easily verify and validate requests to detect possible attempts at fraud.

According to a particular characteristic, the method furthermore comprises a step of transmission, to a communications terminal of the user, of a piece of data representing parameters for connection to the payment server.

Thus, the communications terminal is protected from attempts at hacking. Indeed, since it is limited to receiving parametric data dynamically (i.e. at the time in which the payment transaction is made), it is not required to store this data permanently and, when the transaction is terminated, it can erase this data. This means that a hacking attempt in which it is attempted to obtain connection data for connection to a payment server would be doomed to failure since the communications terminal (or even more so the secured component of this communications terminal) would include no data enabling it to obtain this data. In one alternative embodiment, the transmission of the connection parameters for connection to the payment server is done by means of the merchant server. This means that the transaction server is released from a task of transmission to the communications terminal. It thus has a sort of firewall created between the transaction server and the communications terminal.

According to one particular characteristic, said request for processing a transaction comprises a piece of data representing an identifier of the user's communications terminal.

Thus, by indirection, the transaction server is capable of identifying the communications terminal which plays the role of a payment terminal for this transaction. Accessorily, in a specific embodiment, the transaction server can also obtain data representing this communications terminal by means of this identifier. Such data can for example make it possible to check that the communications terminal has not been placed on a blacklist of communications terminals not authorized to make transactions. These may for example be communications terminals suspected of being pirate or spurious terminals.

According to one particular characteristic, said piece of data representing an identifier of the user's communications terminal comprises an identifier of a transaction-processing component of the user's communications terminal.

Thus, again by indirection, the transaction server can verify this status of the transaction-processing component.

According to one particular characteristic, the method furthermore comprises a step for obtaining a piece of data representing a transaction number.

Thus, the transaction-processing electronic device is the organizer of the transactions to be made with the payment server. It therefore carries out an optimized management of the processing of transactions according to the different payment servers at its disposal. In one particular embodiment, it is capable for example of making a selection, among a plurality of payment servers, of the payment server that is in charge of processing a particular transaction. Besides, when a single payment server is available, the transaction server makes sure that the payment server processes a transactions in the order in which it is given.

According to one particular characteristic, said step for obtaining a piece of data representing a payment parameter comprises a step of searching, within a data structure, for at least one parameter associated with said merchant server.

Thus, the subsequent adjustment of the payment terminal parameters depends not on the data given by the merchant but on the data obtained by the transaction server. This means that this data cannot be modified on the fly, for example by intercepting and modifying the parameters that would be directly transmitted by the merchant. Besides, since only the identifier of the merchant is transmitted to the transaction server, any attempt at fraud by modifying the merchant's identifier (in order to credit a bank account different from the merchant's bank account) would also be doomed to failure because the fraudulent individual would also need to have parameters at his disposal that are directly accessible through the transaction server. If this were to happen, the fraudulent individual would then be directly identifiable and placed on a blacklist.

According to one particular characteristic, the method furthermore comprises a step for transmitting a piece of confirmation data to the merchant server.

According to another aspect, an electronic device is also described for processing transactions, capable of carrying out a processing of transactional data, said data being representative of payment between a user and a merchant. Such a device comprises:
  means for receiving a request for processing a transaction coming from a merchant server;
  means for obtaining a piece of data representing a payment parameter associated with said merchant server;
  means for transmitting a request for payment processing to a payment server.
Depending on the embodiments, it also comprises all the other means for implementing the steps described here above.

According to a preferred implementation, the different steps of the methods according to the proposed technique are implemented by one or more software programs or computer programs comprising software instructions intended for execution by a data processor of a relay module according to the proposed technique and being designed to command the execution of the different steps of the method.

The proposed technique is therefore also aimed at providing a program capable of being executed by a computer or a data processor, this program comprising instructions to command the execution of the steps of a method as mentioned here above.

This program can use any programming language whatsoever and can be in the form of a source code, object code or intermediate code between source code and object code, such as in a partially compiled form or in any other desirable form whatsoever.

The proposed technique also seeks to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to execute or to be used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here above for the module concerned. Such a software component is executed by a data processor of a physical entity (terminal, server, gateway, router, etc) and is capable of accessing the hardware resources of this physical entity (memories, recording media, communications buses, input/output electronic boards, user interfaces, etc).

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the proposed technique.

BRIEF DESCRIPTION OF THE DRAWINGS

Other features and advantages of the proposed technique shall appear more clearly from the following description of a preferred embodiment, given by way of a simple illustratory and non-exhaustive example and from the appended drawings, of which.

DETAILED DESCRIPTION

As explained here above, the object of the present invention is to facilitate payment by making sure that it can be done simply and in a secured manner. More particularly, the payment is done by implementing a secured, transaction-processing component in a communications terminal. This secured transaction-processing component acts as multi-merchant payment terminal. Thus, the solution of the invention provides increased security for transactions made while at the same time preventing a situation where the user is required to enter data, especially bankcard data, when making payment.

It can also be recalled, for practical purposes, that in a classic use, a payment terminal takes the form of a device physically installed at a merchant's premises, a device that enables the reception of payment from clients using a payment card.

Increasingly, merchants have multi-technology payment terminals which accept payment by smartcard as well as payment by magnetic card and payment by contactless card. The classic payment terminal is configured to work with one merchant uniquely: this means that the payment terminal has a configuration that cannot be modified by the merchant. This configuration comprises a certain number of parameters which are for example bank identifiers (enabling connection or again certifying exchanges with the merchant's bank establishment) or again settings for connection to servers. Thus, intrinsically, a classic payment terminal is linked to the merchant and not to the client.

The approach of the proposed technique is quite different: the idea is to have a transaction-processing component that is secured and fulfills the role of a payment terminal that is a multi-merchant terminal. The component installed within the user's communications terminal offers multi-merchant processing capacities because it can be configured: this component makes it possible in a way to convert the user's communications terminal into a payment terminal for the time of the payment transaction. This means that it is possible, with the proposed technique, to carry out payment transactions remotely (i.e. e-commerce transactions) without having to enter or pre-record one's bank data in an external software program.

In one embodiment, the transaction-processing component (secured component) is a component which has a contactless communications interface at its disposal or uses such an interface: this interface enables the user to use a contactless payment card: from the user's viewpoint, the payment is done by applying one's contactless payment card or making it approach the vicinity of a predefined zone of the communications terminal. The payment experience is therefore greatly facilitated for the client.

From the merchant's viewpoint, the rate of conversion is maximized: indeed, since the payment experience is facilitated, the risk of losing a customer during the payment operation is reduced to a corresponding extent.

Be that as it may, the proposed technique does not relate to a secured component intended for use within a communications terminal but to the particular use of a set of means implemented within one or more communications networks to enable an implementation of a payment.

Figure 1:
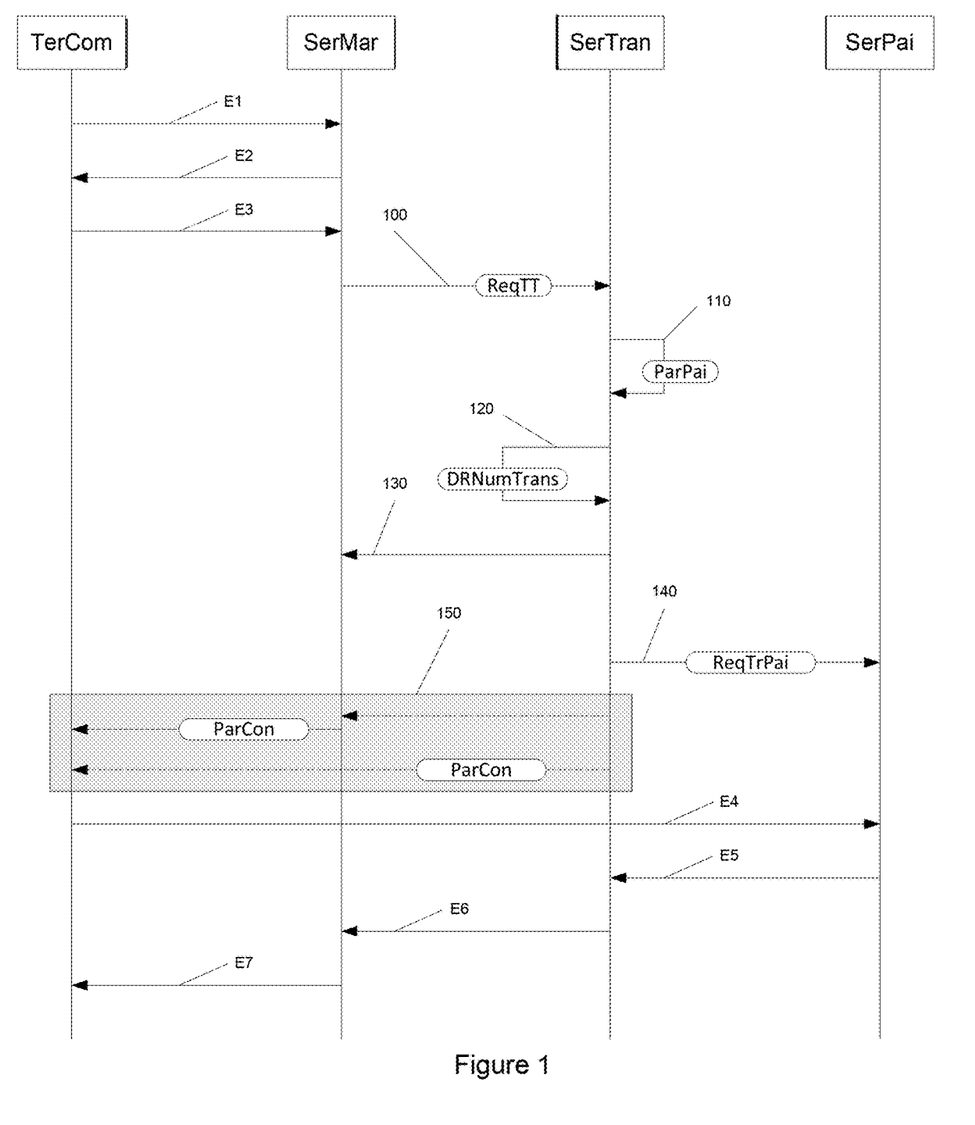
FIG. 1 is a block diagram of the proposed technique, seen from the viewpoint of the transaction-processing server.

More particularly, the proposed technique relates to the implementing of payment by a server which is capable of configuring the secured component of the communications terminal on the fly so as to enable it to carry out the payment directly with the payment server. From the viewpoint of this server, the technique implemented is the following, described with reference to FIG. 1. The idea is to carry out a transactional data processing operation representative of payment between the user (U) and the merchant (M). The method is then implemented by an electronic transaction-processing device (the server) situated within a communications network. The method implemented in the device for processing transactions comprises:

- a step (100) for receiving a transaction-processing request (ReqTT) coming from a merchant server (SerMar); depending on operating conditions, this request can include a piece of data representing an identifier of the merchant server;
- a step (110) for obtaining a piece of data representing a payment parameter (ParPai) associated with said merchant server (SerMar); these parameters are obtained for example by using the identifier of the merchant server in order to carry out a search within a database for payment parameters;
- a step (120) for obtaining a piece of data representing transaction number (DRNumTrans); this step is optional from the viewpoint of the server: indeed, the transaction number can be provided by another means without the server being necessarily informed about this number;
- a step (130) for transmitting a piece of confirmation data intended for the merchant server (SerMar); this step is optional from the viewpoint of the processing server: indeed, this confirmation can also be transmitted by other means without the processing server being necessarily informed about it;
- a step (140) for transmitting a payment-processing request (ReqTrtPai) to a payment server (SerPai);
- a step (150) for transmitting a piece of data, to a user's communications terminal, representing connection parameters (ParCon) for connection to the payment server (SerPai); this step is either implemented directly by the transaction-processing server or implemented by indirection, using the merchant server.

Prior to the implementing of the method, the merchant server (SerMar) receives (E1) a payment request from the communications terminal (TerCom) (the user wishes to make the payment). In response to this request, the merchant server makes (E2) a check on the presence of a secured component. The terminal transmits (E3) a piece of data indicating whether or not the secured component is present in the communications terminal (TerCom).

It will be understood of course that most of the exchanges made between the servers and the secured component are encrypted and that the symmetrical or asymmetrical encryption keys used are elements at the disposal of these different entities.

As indicated, the merchant server transmits the transaction-processing request (ReqTT) to the transaction server. Such a transmission is possible because the merchant server is a server that carries out the check on the presence of the secured component in the user's communications terminal. Indeed, at the time of payment, the merchant server, using a specific payment application (checkout application), tries to verify the presence of the secured component in the user's communications terminal. When this attempt ends in detection, the merchant server transmits the transaction-processing request (ReqTT) to the transaction server. When this attempt does not lead to the detection of the component, then the merchant server implements a classic payment process in which the user is redirected to a bank server web page so that the user can enter his bankcard data.

The detection of the presence of the secured component in the user's communications terminal can be accompanied by the obtaining, by the merchant server, of an identifier corresponding to this secured component. This identifier is provided by the manufacturer of the secured component. It enables the component to be identified uniquely amongst all the existing secured components. It also makes it possible, as shall be explained here below, to monitor the state of operation of this secured component. Besides, the detection of the presence of the secured component at the user's communications terminal is preceded or accompanied as the case may be by the obtaining of a network communications address of the communications terminal. For example, the merchant server can obtain the IP (Internet Protocol) address. Such an address is useful, in the context of the present technique, because it enables the transaction-processing server (to which this address is transmitted by the merchant server) to have available a location (network) of the communications terminal. The transaction-processing server can then carry out two operations, possibly optional (depending on the operational implementation of the present technique):

- the transaction-processing server can directly come into contact with the communications terminal to verify, for example, that the secured component is working well and has not undergone or is not undergoing any attacks from a program, an individual or another component;
- the transaction-processing server can provide the communications terminal with the parameters for connection to the payment server;
- the transaction-processing server can verify the real location of the communications terminal (on the basis of the IP address, a real location that is more or less precise can be obtained): the server can then place the user's communications terminal on a blacklist if the location of the user's communications terminal is different from a location expected by the transaction-processing server;
- the transaction-processing server can also obtain the identifier of the secured component (if this identifier has not already been provided by the merchant server).

In any case, before carrying out operations needed to finalize the payment transaction, the transaction payment server can communicate with the merchant server in order to determine the reliability of the secured component and the capacity of this component to properly conduct a payment transaction. The different steps implemented for this purpose of checking can include other steps than those explained here above.

The checks and searches made by the transaction payment server for parameters implement data structures for storing parameters and/or values. Such structures can take the form of databases or files.

When the transaction-processing server decides to implement the transaction by means of the secured component, the server then implements steps making it possible on the one hand to prepare this secured component so that it acts as a merchant's payment terminal (i.e. a payment terminal associated with the merchant) and secondly inform the bank server of the forthcoming implementation of a payment server.

The preparation of the secured component makes it necessary to obtain a piece of data representing a payment parameter associated with said merchant server. It can typically be data for identifying the merchant and/or encryption keys associated with the merchant. It can also be data pertaining to a merchant's bank account to which the amount of the transaction must be credited. The component also receives an IP address from the bank server to which it must get connected. This IP address can be provided in a second stage once the secured component is capable of setting up a secured link with the transaction-processing server or once the transaction-processing server has selected the payment server that must make this transaction.

It must be remembered that the secured component of the communications terminal is devoid of all payment information prior to the reception of data from the server. This secured component must therefore, before each transaction, receive data so that it can behave like a physical payment terminal. It must be added that the end of the payment transaction (i.e. confirmation that payment by the payment server has been taken into account) implies the destruction of the data received by the secured component. Ultimately, at the end of the transaction, the secured component returns to its initial state. In order to enable secured communications, the secured component however has one or more keys (public and/or private) keys at its disposal permanently or semi-permanently to conduct secured exchanges either with the merchant servers or with the transaction-processing server.

Depending on the embodiments and the operational implementation of the present technique, the configuration of the secured component is implemented either directly by the transaction-processing server (which then takes charge of this task in avoiding the intervention of the merchant server) or by indirection. The transaction-processing server then sends the merchant server the data needed to configure the secured component, and the merchant server then transmits this data to the secured component (using the physical communications interface of the communications terminal).

Both approaches have advantages: in the first approach, the action by an actor (the merchant server) is eliminated and the security of the transaction is therefore reinforced. The second approach reduces the transaction needs of the transaction-processing server which does not need to have the major resources needed for communications with a very large number of communications terminals.

To inform the bank server that it is going to process a transaction, the transaction-processing server sends a request to the bank server. This request optionally comprises a transaction identifier (such as for example the transaction number). This request also comprises the identifier of the secured component of the communications terminal. As the case may be, other data can be provided, such as the IP address of the user's communications terminal so that the payment server is capable of accepting or not accepting a transaction coming from this communications terminal.

Prior to the transmission of this data to the transaction server in the form of a request, the transaction-processing server obtains a transaction number to be processed. The transaction number is an identifier that enables the data of the transaction to be associated together. This is a perennial identifier: the identifier and the associated data are kept, for example, in one or more databases for subsequent use of this data (for example as proof). The identifier of the transaction is then either directly generated by the transaction-processing server or obtained from another server or servers. This implementation depends on the operational conditions and is not described in detail.

Once provided with this data, the bank server is capable firstly of accepting or not accepting a connection from the communications terminal (in carrying out for example a check on the original address of the requests transmitted by the communications terminal) and secondly checking that the secured component which wishes to validate the transaction truly corresponds to the previously identified secured component. The payment server prepares the software instances needed for processing the transaction and goes into hold for the request coming from the secured component.

Prior to the transmission of this request, the transaction-processing server can also make a choice of a payment server when several payment servers are available to process the request. Thus, the transaction-processing server is capable of efficiently distributing the load on these payment servers.

When the preparation of the secured component and of the payment server is done, the transaction-processing server goes into hold for reception (E5) (if any) of confirmation of payment from the payment server.

The act of payment (E4), FIG. 1, itself is done by the user who places his contactless payment card on a specific location of his communications terminal so that the secured component can retrieve the data of the payment card and transmit this data to the payment server so that it can make payment).

Prior to or subsequently to the reception of such a confirmation, it can also itself transmit (E6) confirmation of end of processing of the transaction to the merchant server so that it can for example redirect (E7) the web browser of the communications terminal to an end-of-transaction page which, to the user, is equivalent to an indication that the payment-processing operation has been completed.

Figure 2:
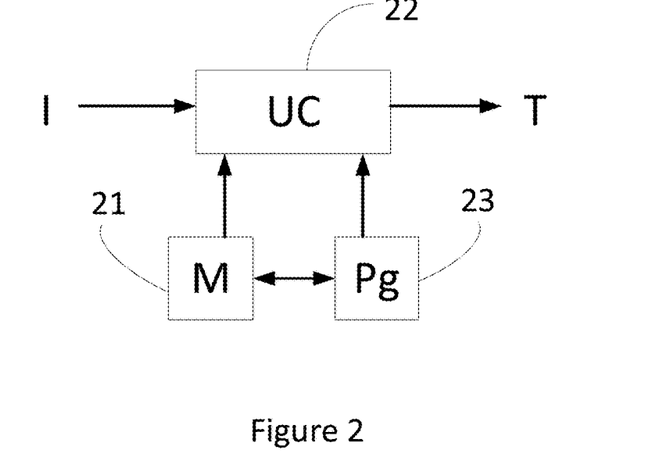
FIG. 2 provides a brief description of the physical architecture of the transaction-processing server.

Referring to FIG. 2, we describe a device comprising means to execute the method described previously. Such a device takes for example the form of a transaction-processing server.

For example, the device comprises a memory 21 constituted by a buffer memory, a processing unit 22 equipped for example with a microprocessor and driven by the computer program 23 implementing the steps needed to process transactions, in indirection, between the merchant server, the secured component and the payment server.

At initialization, the code instructions of the computer program 23 are for example loaded into a memory and then executed by the processor of the processing unit 22. The processing unit 22 inputs for example a transaction-processing request coming from the merchant server. The microprocessor of the processing unit 22 implements the steps of the processing method according to the instructions of the computer program 23 to prepare the transaction with the secured component and to prepare transmission to the payment server.

To this end, the device comprises, in addition to the buffer memory 21, means for obtaining configuration data, possibly an encryption processor and communications means such as network communications modules enabling the transmission and the reception of data. These means can be driven by the processor of the processing unit 22 according to the computer program 23. These means also take the form of modules, software programs or hardware units specifically dedicated or not dedicated to the implementing of the present technique. Besides, the processor in charge can be a secured processor used to prevent an attack during the encryption and decryption phases.

The technique also relates to a multi-merchant payment terminal as described here above. Such a multi-merchant payment terminal takes various forms. In a simple form, such a terminal comprises a network communications interface. This interface enables the payment terminal to receive data coming from servers, among them the merchant server and the transaction server. Such an interface can be an independent interface or an interface managed by the device within which the payment terminal is installed or connected. In this same simple form, the payment terminal comprises a contactless communications interface. Such a contactless communications interface enables the transmission of a signal to a payment card (or to an NFC communications terminal) so that this terminal, in response, can send the data needed for payment. This contactless communications interface can be an independent interface or an interface managed by a device within which the payment terminal is installed or connected. In a distributed embodiment, which is the one described here above, the multi-merchant payment terminal is therefore formed by a set comprising a secured component and communications interfaces borrowed from the communications terminal within which the secured device is installed.

The technique also relates to a method for managing payment, implemented by a multi-merchant payment terminal as described here above. Such a method comprises, from the viewpoint of this terminal, a step of transmission to the merchant server of a payment request (the user wishes to make payment). In response to this request, the merchant server carries out a check on the presence of a secured component (i.e. the presence of the multi-merchant payment terminal): the communications terminal receives a request for checking the presence of the secured component. The terminal (communications or payment terminal) transmits data indicating the presence of the secured component in the communications terminal.

The payment terminal (or the communications terminal) then receives a piece of data representing connection parameters (ParCon) for connection to the payment server (Ser-Pai). This reception activates the self-configuration of the multi-merchant payment terminal. At the time of this self-configuration, the multi-merchant payment terminal becomes a terminal dedicated solely to the merchant for whom the payment has to be made. The network and contactless communications interfaces are then exclusively under the control of the secured processor so as to implement the payment. When these network and contactless communications interfaces are shared with a communications terminal, the self-configuration comprises a process for blocking these interfaces to the benefit of the secured processor.

The secured processor then receives the data from the contactless interface needed for the payment (bankcard number, name, expiry date, etc.) and transmits this information, as well as complementary pieces of data proper to the payment transaction, to the payment server. During these steps for receiving data from the NFC interface and for building and transmitting the transaction to the payment server, the payment terminal uses the connection parameters and configuration parameters received earlier.

When the transaction is validated, the communications terminal then receives the configuration data coming from the merchant server. The secured processor then gets rid of the configuration data and regains the possibility of carrying out a payment operation for another merchant in a forthcoming transaction.

The invention claimed is:

1. A method comprising:
remotely configuring a user's communication terminal with configuration data by an electronic device enabling the user's communication terminal to connect with a payment server over a communication network, the configuration data converting the user's communication terminal into a physical payment terminal for a specific merchant server dynamically during a transaction between the user's communication terminal and the specific merchant server, said configuring comprising:
the electronic device receiving a first request for processing the transaction from the specific merchant server, said first request comprising data representing an identifier of the specific merchant server and an identifier of an electronic secured transaction-processing component embedded in the user's communication terminal, said electronic secured transaction-processing component having a communication interface enabling communication with a payment card; said first request being associated with a previous request for processing the transaction sent by the user's communication terminal to the specific merchant server prior to the first request sent by the specific merchant server, transmission of said first request being triggered by the specific merchant server receiving a piece of data, from the user's communication terminal, indicating presence of the electronic secured transaction-processing component and comprising said identifier of the electronic secured transaction-processing component;
in response to receiving the first request:
the electronic device obtaining data representing a payment parameter associated with said specific merchant server from a data structure based on the identifier of the specific merchant server received with the first request;
the electronic device transmitting a request for processing payment to the payment server comprising the identifier of the electronic secured transaction-processing component to prepare the payment server for connection with the user's communication terminal; and
the electronic device configuring the electronic secured transaction-processing component of the user's communication terminal dynamically during the transaction by transmitting to said electronic secured transaction-processing component, either directly or through the specific merchant server, the configuration data, which comprise said data representing the payment parameter associated with said specific merchant server and connection parameters, including an Internet Protocol (IP) address of the payment server, wherein the configuration data configure the electronic secured transaction-processing component to behave as the physical payment terminal for the specific merchant and connect to the payment server over the communication network; and
the secured transaction-processing component of the user's communication terminal connecting with the payment server using the configuration data and then erasing the configuration data when the transaction is terminated.

2. The method for processing according to claim 1, wherein the method furthermore comprises the electronic device obtaining data representing a transaction number.

3. The method for processing according to claim 1, wherein said obtaining data representing the payment parameter comprises the electronic device searching, within the data structure, for at least one parameter associated with said specific merchant server.

4. The method for processing according to claim 1 wherein the method furthermore comprises transmitting confirmation data to the specific merchant server.

5. The method according to claim 1, wherein the method furthermore comprises:
the payment server carrying out the transaction with the electronic secured transaction-processing component of the user's communication terminal based on the configuration data transmitted to the electronic secured transaction-processing component, the carrying out including the payment server verifying that the secure transaction-processing component that attempts to validate the transaction corresponds to the identifier of the secured transaction-processing component that was previously transmitted by the electronic device to the payment server.

6. A system comprising:
an electronic device comprising at least a hardware processor configured to remotely configure a user's communication terminal with configuration data enabling the user's communication terminal to connect with a payment server over a communication network, the configuration data converting the user's communication terminal into a physical payment terminal for a specific merchant server dynamically during a transaction between the user's communication terminal and the specific merchant server, by:
receiving a first request for processing the transaction from the specific merchant server, said first request comprising data representing an identifier of the specific merchant server and an identifier of an electronic secured transaction-processing component embedded in the user's communication terminal, said electronic secured transaction-processing component having a communication interface enabling communication with a payment card; said first request being associated with a previous request for processing the transaction sent by the user's communication terminal to the specific merchant server prior to the first request sent by the specific merchant server, transmission of said first request being triggered by the specific merchant server receiving a piece of data, from the user's communication terminal, indicating presence of the electronic secured transaction-processing component and comprising said identifier of the electronic secured transaction-processing component;
in response to receiving the first request:
obtaining data representing a payment parameter associated with said specific merchant server from a data structure based on the identifier of the specific merchant server received with the first request;
transmitting a request for processing payment to the payment server comprising the identifier of the electronic secured transaction-processing component to prepare the payment server for connection with the user's communication terminal; and
configuring the electronic secured transaction-processing component of the user's communication terminal dynamically during the transaction by transmitting to said electronic secured transaction-processing component, either directly or through the specific merchant server, the configuration data, which comprise said data representing the payment parameter associated with said specific merchant server and connection parameters, including an Internet Protocol (IP) address of the payment server, wherein the configuration data configure the electronic secured transaction-processing component to behave as the physical payment terminal for the specific merchant and connect to the payment server over the communication network; and the user's communication terminal, wherein the secured transaction-processing component of the user's communication terminal is configured to connect with the payment server using the configuration data and then erase the configuration data when the transaction is terminated.

7. The system according to claim 6, wherein the at least one hardware processor is further configured to:

in response to receiving the first request for processing the transaction, transmit the configuration data to the specific merchant server, enabling the specific merchant server to transmit the transmitted configuration data to said electronic secured transaction-processing component of the user's communications terminal.

* * * * *